United States Patent [19]
Wieland

[11] 3,733,457
[45] May 15, 1973

[54] STUD WELDING TOOL CONSTRUCTION

[75] Inventor: Howard N. Wieland, Amherst, Ohio

[73] Assignee: TRW Inc., Cleveland, Ohio

[22] Filed: May 20, 1970

[21] Appl. No.: 51,030

Related U.S. Application Data

[62] Division of Ser. No. 722,607, April 19, 1968, abandoned.

[52] U.S. Cl. .................................. 219/98, 219/234
[51] Int. Cl. ........................................... B23k 9/20
[58] Field of Search ............... 46/17, 223; 219/230, 219/235, 98, 99, 234, 236, 370; 228/52, 55; 81/334

[56] References Cited

UNITED STATES PATENTS 3,236,002  2/1966  Cunningham et al. .................. 46/17
3,286,076  11/1966  Finch .................................. 219/230

Primary Examiner—R. F. Staubly
Attorney—Allen D. Gutchess Jr.

[57] ABSTRACT

The body of a stud welding tool is made of a plurality of separate parts. The main housing of the tool thereby can be employed for different applications without the necessity of designing and molding a different housing for each application. The handle of the welding tool body is made of several portions which enable an operator to have access to the interior more readily and more easily. The welding tool also has an internal component through which current is supplied to a chuck of the tool, and which causes fasteners to be transferred from a point behind the chuck into the chuck. The component is compact and relatively maintenance free. In particular, the welding tool can be substantially shorter and lighter than those of a like nature heretofore employed.

1 Claim, 6 Drawing Figures

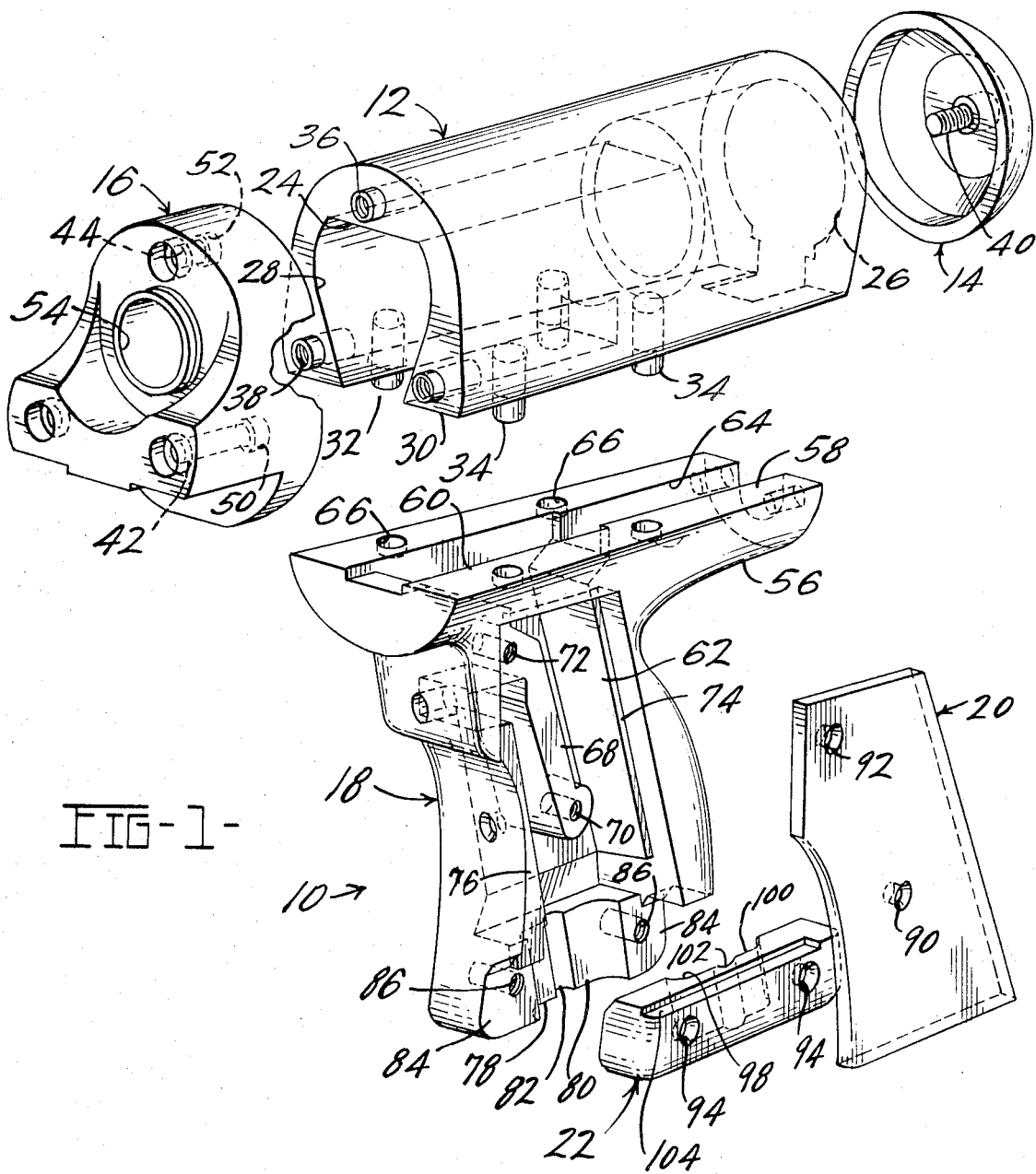
FIG-1-

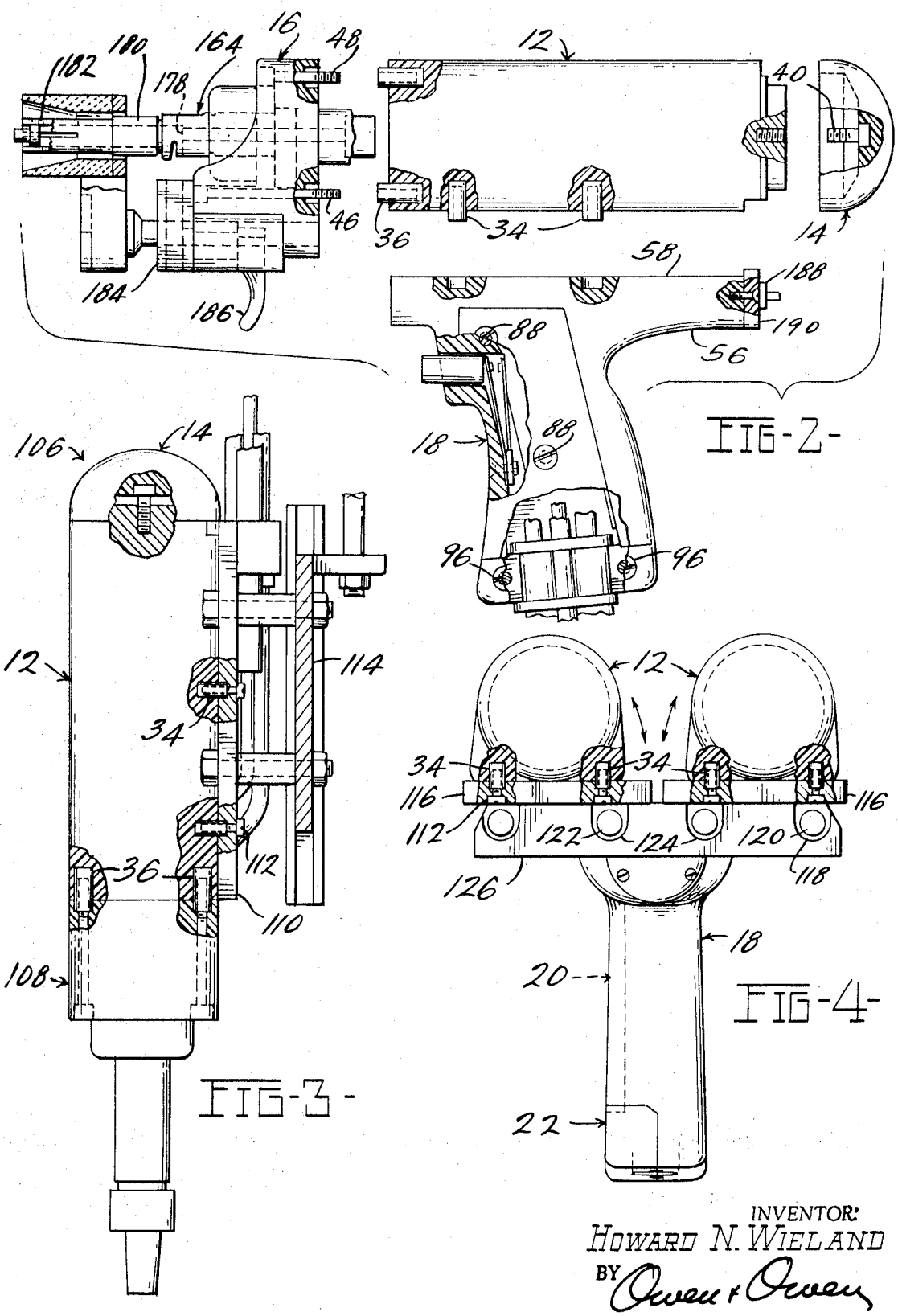

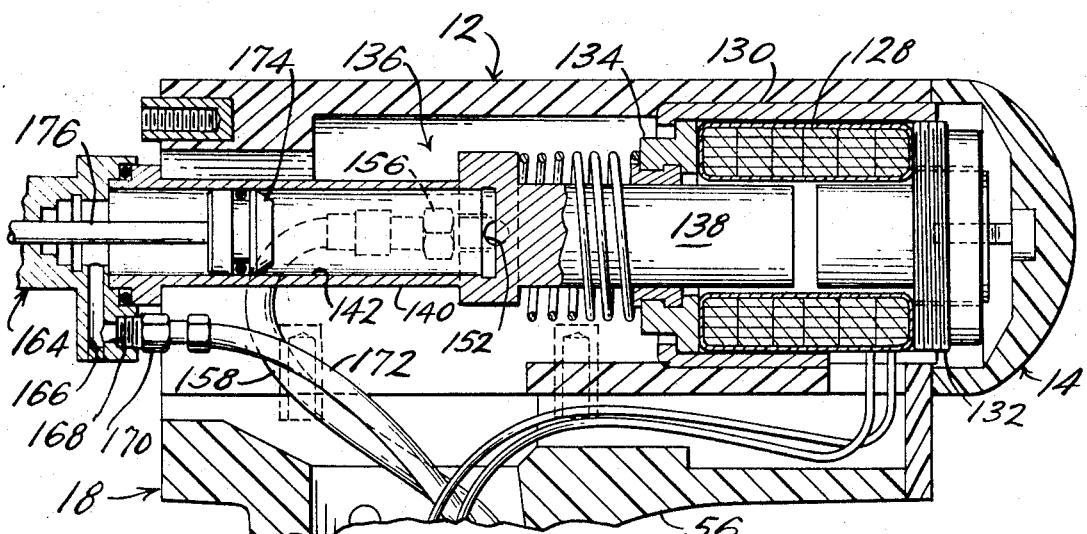
FIG-5-
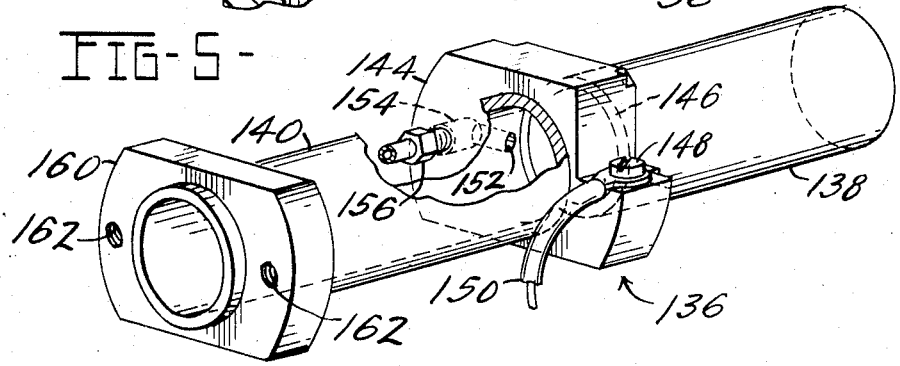
FIG-6-

STUD WELDING TOOL CONSTRUCTION

This is a divisional of application Ser. No. 722,607 filed Apr. 19, 1968, now abandoned.

This invention relates to a stud welding tool and more particularly to a compact stud welding tool having a multi-part body.

Stud welding tools for welding studs to workpieces at relatively high rates are finding increasing use in the art. With the higher welding rates, it has become increasingly more important to enable the chucks of the welding tools to be loaded more rapidly. Various loading systems have heretofore been proposed for feeding studs automatically to stud welding tools. However, such tools have been relatively cumbersome and the systems have met with a number of disadvantages. The present stud welding tool employs components serving multipurposes which enable the tools to be more compact and less cumbersome than heretofore. Accordingly, an internal component located substantially within the body of the welding tool provides a connection for a welding cable, constitutes a core for a lifting coil, forms a cylinder containing a piston for transferring studs into a chuck and holding them during a welding operation, and provides additional connections for air lines for supplying air to the cylinder for driving the piston. The component is connected to a chuck adaptor located forwardly of the welding tool body which provides the connection for the forward air line for supply air to the front of the cylinder.

The present invention also provides a stud welding tool having a body constructed of several unique parts. The construction in particular enables the main housing of the stud welding tool body to be employed in a number of different applications without any modification whatsoever. For example, the same housing used in a single hand-operated and manipulated stud welding tool can be used in a production welding machine and also in a multiple hand-held welding tool assembly. The multi-part construction also enables certain parts of the welding tool to be more readily and easily accessible for maintenance or repair.

It is, therefore, a principal object of the invention to provide an improved stud welding tool having a main housing which can be used for a number of different applications.

Another object of te invention is to provide a stud welding tool having more rapidly accessible internal portions.

Still another object of the invention is to provide a stud welding tool of more compact design with a single component capable of multiple functions.

Other objects and advantages of the invention will be apparent from the following detailed description of a preferred embodiment thereof, reference being made to the accompanying drawings, in which:

FIG. 1 is an exploded view in perspective of a stud welding tool body embodying the invention;

FIG. 2 is an exploded side view in elevation, with parts broken away and in secton, of a stud welding tool which includes the multi-part body shown in FIG. 1;

FIG. 3 is a somewhat schematic side view in elevation, with parts broken away and in section, of a main housing of the stud welding tool body used with other components in a production welding machine;

FIG. 4 is a somewhat schematic rear view in elevation, with parts broken away and in section, of a modified hand-manipulated stud welding tool embodying two of the main housings of the welding tool body;

FIG. 5 is an enlarged, fragmentary view in vertical, longitudinal cross section through the welding tool housing and showing internal components thereof; and FIG. 6 is a view in perspective, with parts broken away and with parts in sectiom, of an internal component of the tool shown in FIG. 5.

Referring to FIG. 1, a multi-part, hand-operated welding tool body is indicated generally at 10. The tool, when fully assembled with internal components, can be used to weld studs by an arc welding technique as disclosed in Nelson U.S. Pat. No. 2,191,494 or in Glorioso U.S. Pat. No. 3,163,880. However, the tool body also can be employed for welding studs according to the disclosure in Graham U.S. Pat. No. 2,610,278, or by resistance welding. As shown, the welding tool body 10 includes six parts, all of which are preferably made of an insulating material. The body includes a main, hollow housing 12 having a rear end cap 14 and a front wall member 16 which enclose the ends of the housing. The body further includes a handle 18 having a main cover 20 and a short, lower clamping member or cover 22.

The main housing 12 is hollow and forms an interior chamber 24 extending completely through the housing and terminating in a rear opening 26 and a forward opening 28. The housing 12 further has a lower mating surface 30, which is preferably substantially flat, with an elongate opening 32 communicating with the chamber 24. Four dowel or locating pins 34 are preferably molded directly into the body 12 and extend from the mating surface 30 at spaced intervals on opposite sides of the opening 32. The housing 12 also has dowel or locating pins 36 extending from the front end thereof, with three of the pins 36 being shown. The pins 36 have internal threads 38 for fasteners for the front wall member 16.

The rear end cap 14 has a central threaded shank 40 which is affixed to a core stop to be discussed subsequently. The front wall member 16 has a rear surface cooperating with the forward end surface of the housing 12 and has passages 42 and 44 which receive machine screws 46 and 48 (FIG. 2) which are engaged in the threaded pins 36. The pins 36, in turn, are received in counterbored recesses 50 and 52 in the member 16 to precisely locate the member 16 with respect to the housing 12, thereby maintaining a smooth continuity of the outer surfaces of the housing 12 and the member 16. The accurate positioning is also necessary to properly align a central opening 54 in the member 16 with the chamber 24 of the housing 12.

The handle 18 has an upper flared portion 56 which is contoured to fit smoothly with the exterior surfce of the housing 12. The handle terminates in an upper mating surface 58 which can be substntially flat and, in any event, is designed to match or cooperate with the mating surface 30 of the housing 12. An opening 60 in the mating surface 58 communicates with a hollow interior chamber 62 of the handle 18 and also is generally aligned with the opening 32 of the housing 12. A trough or groove 64 extends rearwardly in the flared portion 56 from the upper end of the chamber 62 to receive electrical conductors. The mating surface 58 also has four openings or recesses 66 which are precisely formed in the handle 18 to cooperate with the locatng pins 34 to properly position the handle 18 with respect to the housing 12.

When the housing 12 is assembled with the handle 18 for use as a hand-operated stud welding tool, the two parts are preferably permanently assembled by the use of epoxy or a similar adhesive material affixing the mating surfaces 30 and 58. This assures a secure bond between the two parts without the necessity of employing fasteners which would require the handle portion to be larger and specially designed to hide the fastener heads to maintain the smoothness and comfort of the handle. Further, there is no need to separate the two parts once they are joined for use as a hand-operated tool.

The handle 18 has an integral ridge or wall 68 extending into the chamber 62 to separate the chamber into two portions and also to provide threaded recesses 70 and 72 for cover fasteners. The chamber has a shoulder 74 along a rear wall thereof and the handle 18 also forms a flat mating surface 76 on the side of the chamber 62 opposite the shoulder 74. At the lower end, the handle has notches 78 and 80 of relatively large radius and an intermediate notch 82 of smaller radius to receive electrical cables and a fluid line which extend into the interior of the gun body from a remot power source and controls, and a fluid supply. An additional mating surface 84 is formed on each side of the notches with threaded openings 86 located therein.

The handle cover 20 has a flat inner surface facing the chamber 62 with a rear edge portion supported on the shoulder 74 and a forward edge portion supported on the front handle surface 76. Intermediate portions of the cover 20 are supported against the outer surface of the ridge 68 when fasteners 88 (FIG. 2) are inserted in openings 90 and 92 of the cover 20 and turned into the openings 70 and 72. When affixed to the handle 18, the cover 20 forms a smooth continuation of the exterior surfaces thereof to achieve maximum comfort for the hand of the operator.

The clamping member 22 has flat rear surfaces cooperating with the surfaces 84 of the handle and has openings 94 through which fasteners 96 (FIG. 2) extend to hold the clamping member securely against the surfaces 84 of the handle. The clamping member 22 further has two notches 98 and 100 of relatively large radius and an intermediate notch 102 of a shorter radius. When the clamping member 22 is affixed to the lower portion of the handle 18, the notch 98 cooperates with the notch 78 to maintain one electrical cable in place while the notch 100 cooperates with the notch 80 to hold a second electrical cable in place. The notch 82 then holds one fluid line (FIG. 2) against one side of te electrical cables while the intermediate notch 102 holds a second fluid line against the opposite side of the cables. The clamping member 22 also has an upper flat, shallow recess 104 which cooperates with the bottom edge of the main cover 20 to help locate and support the bottom edge of the cover 20.

The arrangement of the main handle cover 20 and cable clamping member 22 is particularly advantageous for obtaining access to the interior of the handle 18. The two cover screws 88 an simply be removed along with the cover 20 at which time, the clamping member 22 remains in place, securely holding the electric cables and the fluid lines. The cables cannot become loose and disoriented, which has heretofore required considerable time on behalf of the operator or repairman to reposition the cables and force them into place in their respective notches, when replacing the cover.

Another advantage in the multi-part construction for the tool 10 is that the main housing 12 can be employed in other types of stud welding tools and applications without the necessity of any change in the shape or design thereof. Referring to FIG. 3, a production welding tool indicated at 106 is shown for use with a production welding machine. The tool 106 includes the housing 12, without modification, and also the end cap 14, in this instance. A modified lower wall member 108 is assembled with the housing 12 through the locating pins 36. However, the member 16 can be used here, if desired. The housing 12 is affixed to a mounting plate 110 in this instance by fasteners 112 which are received in the locating pins 34 which are also internally threaded. The internal threading is not necessary for the hand-operated stud welding tool 10 of FIG. 1, but enables the body to be used with the fasteners 112 in fIG. 3 without the necessity of employing special pins. The mounting plate 110 is affixed to a suitable fixture 114 which can carry a plurality of the tools 106 in particular positions for various production welding operations.

FIG. 4 shows another application for the stud welding tool housings 12 without any modification thereof. In this instance, two of the housings 12 are employed to provide two stud welding tools manipulated by a single handle. The housings 12 are affixed to pivoted mounting plates 116 by the fasteners 112 turned into the pins 34. The hinged plates 116 have outer ears 118 suitably affixed thereto with the ears receiving hinge pins 120 which enable the plates 116 to pivot upwardly and outwardly, as shown by the arrows, when removable fastener pins 122 are withdrawn from inner ears 124. This provides access to the interior of the double tool and also enables the individual tool housings 12 to be spaced farther apart, if desirable, to increase the spacing between the studs being welded. In such an instance, additional means would be provided to maintain the plates 116 in partially open or angular positions. A hollow member 126 of the double hand tool, which pivotally receives the mounting plate 116, can be mounted on the handle 18 with the cover plate 20 and the clamping member 22. Self-threading fasteners can extend downwardly through the mounting member 126 and into the recesses 66 in the mating surface 58 of the handle.

Referring now more particularly to the internal components of the tool, as shown in FIG. 5, a lifting coil 128 is held in a coil sleeve 130 which can be molded directly in the main housing 12. The outer end of the sleeve 130 is threaded to receive a core stop member 132 having a central threaded passage for the threaded shank 40 of the end cap 14. A core bearing sleeve 134 is supported at the forward end of the sleeve 130.

An internal welding component 136 serves several functions for the tool including acting as a core to be drawn into the coil 128 and lift a chuck attached to the front end thereof. The component 136 also serves to operate feeding means for feeding studs into the chuck of the tool from the rear. Finally, the component 136 serves as a conductor for supplying welding current to the chuck and the stud. The component 136 includes a solid, integral core 138 at the rear thereof and a wall 140 at a forward portion forming a double-acting fluid cylinder 142. At an intermediate portion of the component is an enlarged portion 144 having a notch 146 on one side thereof, as shown in FIG. 6, which receives a terminal screw 148 for an electrical welding cable 150.

The entire component 136 is conductive so that weld current is supplied through the cylinder wall 140 to the forward portion of the welding tool. On the opposite side of the cylinder, in the enlarged portion 144, is a transverse passage 152 and a longitudinal passage 154 receiving a fitting 156 to which a flexible fluid or air line 158 is connected. The flexible fluid line 158 extends forwardly and then bends downwardly and rearwardly into the handle chamber 62.

At the forward end of the internal component 136 is a flange 160 having diametrically opposite threaded openings 162. These receive fasteners which affix a chuck adaptor 164 to the component 136. The adaptor 164 has transverse and longitudinal passages 166 and 168, the latter receiving a fitting 170 for a second flexible fluid line 172 which extends rearwardly, generally parallel ot the component 136 and then downwardly into the handle chamber 62 along with the fluid line 158. The curved relationship of the two flexible fluid lines 158 and 172 as well as the electrical cable 150 enables these to flex easily when the component 136 is moved longitudinally. A piston 174 is located in the cylinder 142 and is driven to opposite ends thereof according to which of the lines 158 and 172 the fluid is supplied. The piston 174 is connected to a piston rod 176 which is integral with a feed plunger 178 (FIG. 2) which feeds studs supplied from the side into a receiving portion 180 of the chuck adaptor 164 and feeds them through a chuck 182 to the forward end thereof at which position the studs are held until welded to a workpiece. The studs can be fed to the receiver 180 from a supply tube (not shown) which is normally received in a fitting 184. The feed tube can be held in the fitting 184 by a quick-release latch (not shown) which is operated by a trigger 186. Feeding of studs can be controlled by a switch 188 (FIG. 2) located in a rear wall 190 covering the rear end of the flared portion 56 of the handle 18.

From the above, it will be seen that the multifunctional achievement of the internal component 136 enables the tool to be much shorter than those heretofore employed where the entire fluid cylinder was located in front of the tool body. The component 136 also enables the overall tool to be lighter by eliminating certain components such as chuck legs heretofore employed between the core and cylinder and which added weight to the tool.

Various modifications of the above described embodiment of the invention will be apparent to those skilled in the art, and it is to be understood that such modifications can be made without departing from the scope of the invention, if they are within the spirit of the accompanying claims.

Having described my invention, I claim:

1. An arc welding tool body comprising a main housing and a front wall member, said housing having a hollow interior and a mating surface at an end portion thereof with an opening extending through said surface and communicating with the interior of said housing, and said mating surface having locating pins extending from predetermined positions thereon, the front wall member having a surface to be mated with the mating surface of the main housing and the surface having counterbored recesses formed therein, each of said pins having a threaded recess therein, said pins extending into counterbored recesses when the main housing is engaged against the front wall member.

* * * * *